United States Patent [19]

Vodin

[11] 4,061,394
[45] Dec. 6, 1977

[54] TONNEAU COVER FOR RECREATIONAL VEHICLE

[76] Inventor: George M. Vodin, 2280 Hassell Road, Hoffman Estates, Ill. 60195

[21] Appl. No.: 648,488

[22] Filed: Jan. 12, 1976

[51] Int. Cl.² .............................................. B60P 7/04
[52] U.S. Cl. .................................. 296/100; 296/137 B
[58] Field of Search ............ 296/99, 103, 100, 137 B, 296/26, 23 R

[56] References Cited

U.S. PATENT DOCUMENTS

| 1,364,292 | 1/1921 | Mackey | 296/23 R |
|---|---|---|---|
| 2,353,820 | 7/1944 | Eddins | 296/99 X |
| 3,201,171 | 8/1965 | Wickard | 296/100 |
| 3,820,839 | 6/1974 | Molatalab | 296/99 |
| 3,954,296 | 5/1976 | Patnode | 296/137 B X |

FOREIGN PATENT DOCUMENTS

| 622,457 | 5/1927 | France | 296/103 |
|---|---|---|---|
| 365,929 | 1/1932 | United Kingdom | 296/26 |

OTHER PUBLICATIONS

J. C. Whitney Catalog (Cat. No. 328) copyright 1974 p. 13 "Economy Tonneau Covers."

Primary Examiner—Joseph F. Peters, Jr.
Assistant Examiner—Michael J. Forman
Attorney, Agent, or Firm—Alter and Weiss

[57] ABSTRACT

A tonneau cover for recreational vehicles of pliable weatherproof material which simultaneously covers the rear cab portion of the passenger compartment, and the load bed, as desired. Utilizing already provided mounting apparatus, the cover seals from moisture and the elements of weather, the cab and load bed of the vehicle while providing means of rearward vision for the user of the vehicle.

10 Claims, 8 Drawing Figures

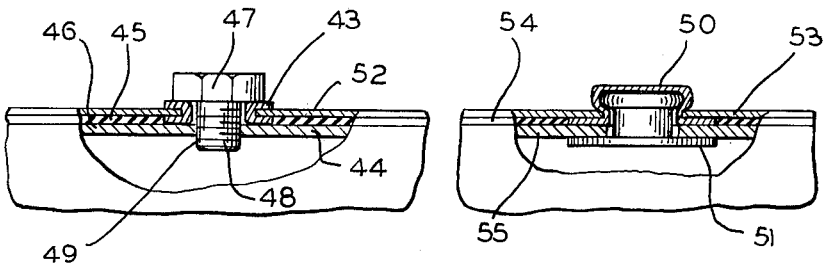
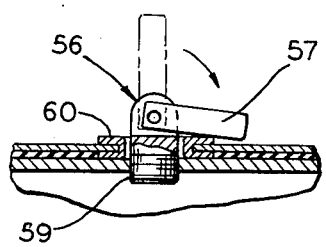
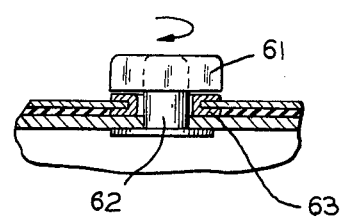
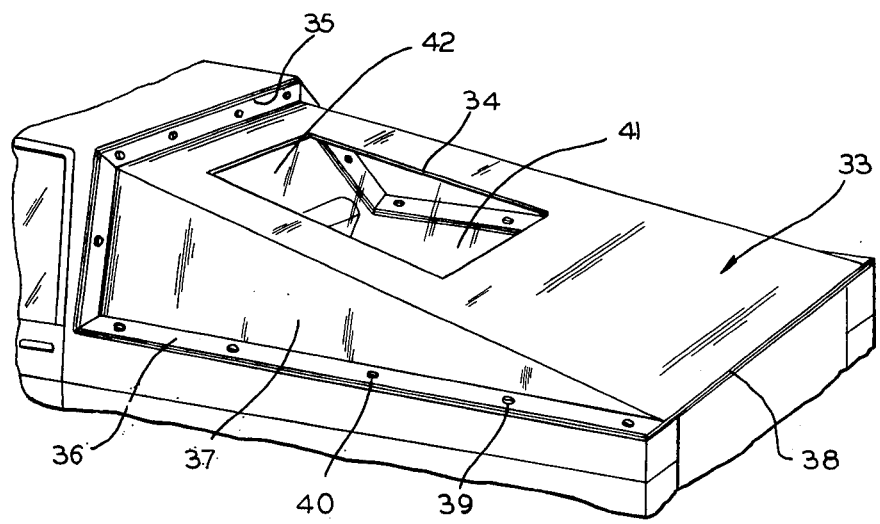

TONNEAU COVER FOR RECREATIONAL VEHICLE

BACKGROUND OF THE DISCLOSURE

The present invention relates in general to automotive enclosure devices and in particular to a tonneau cover for recreational vehicles.

Recently, sales of smaller, four-wheel drive all-terrain vehicles have greatly increased. Several automotive manufacturers market these vehicles which can be outfitted with various optional equipment which make the vehicle close to luxurious.

Several of these vehicles are commonly manufactured with a front cab unit and rear load bed for hauling equipment and can usually be modified with an optional rear seat for conversion to a more "station wagon" type of vehicle. Until most recently these vehicles were sold without a roof, requiring the purchase of an optional fiberglass roof unit which extended from the top of the windshield all the way back and down to the tailgate of the load bed. After marketing several of these vehicles, it was found that the long length of such an optional fiberglass roof unit prompted plastic deformation of the roof with the possibility of resulting cracks. etc. in areas of plastic fatigue. More recently, models of these recreational vehicles are being sold and distributed with a roof that extends from the rear of the passenger compartment to the tailgate with a substantially shorter length and better wearability characteristics.

The particular vehicle for which my invention is intended has an integrated roof from the top of the windshield to the rear of the passenger compartment, ending directly in back of the front seating area at a roll bar. The vehicle is often provided with a removable roof and side panel continuation which extends from the rear of the roll bar to the end of the tailgate, thus covering the load bed portion directly beneath it which is used for loading equipment or can be modified for passengers by the addition of a rear seat unit. While this rigid top, being shorter in length than previous ones does not encounter the plastic fatigue problems associated with the earlier longer and optional roof top, the newer top can still provide some problems for the user of the vehicle. While the conventionally provided recreational vehicle roof and side enclosures assembly provides good resistance to moisture and the elements of weather for the vehicle, they are often difficult to mount, and often cumbersome to position in place adjacent to the rear of the passenger compartment and over the load bed.

It should be noted that recreational vehicles of the type herein discussed are provided without rear compartment enclosure means. In other words, while the passenger cab has a windshield, side windows, and a roof in the cab, there is no cover or window continuing from the roof down to the load bed area so that the rear portion of the cab remains unenclosed. It becomes obvious that in most applications of the vehicle the conventionally equipped rigid enclosure compartment must be used if only for the purpose of covering and enclosing the passengers within the cab.

Just such a rigid cumbersome, usually fiberglass, enclosure device is very difficult to store besides being heavy and unwieldy in mounting. Similarly, a rigid, custom-fitted top makes it virtually impossible to cover just a portion of the rear cab or a portion of the load bed of the recreational vehicle which, under particular circumstances, may not be desirable. When the rigid, conventional roof is on, it covers and encloses both the rear window and the load bed completely, having no capacity for partial placement over one or the other respectively.

Similarly, the rear window of the rigid enclosure apparatus is at the rear of the vehicle and together with the structural framework of the side appendages extending down from the roof, tends to reduce the visibility of the driver from the cab to the rear of the vehicle. The rigid roof and side enclosure device also describes a set compartment configuration within the enclosed vehicle, making difficult the use of the vehicle under circumstances when equipment or goods being hauled extend higher than the roof or are wider than the fabricated sides of the assembly. Associated with this problem is the fact that when such a rigid roof is attached, access to the load bed is limited to a substantially rectangular opening formed at the back of the load bed when the tailgate is down and the window of the roof assembly is up; and to the front compartment when the passenger seats are folded down to enable access.

A rigid roof of the type herein described further increases the outer exposed surface area of the vehicle making the vehicle more susceptible to wind resistance and air drafts when being driven, tending to hurt the handling of such a vehicle. Additionally, the structure of the conventionally provided rigid roof assembly, with its glass side panels and glass rear panel, has the effect of enabling persons outside the vehicle to view equipment loaded into the bed of the vehicle itself, a characteristic which can be highly undesirable when the vehicle is loaded with equipment and other valuables.

It is thus an objective of the present invention to provide a panel cover which appropriately covers the rear cab passenger compartment and load bed simultaneously with weather-resistant material to enclose the cab and load bed areas of such a vehicle from the elements of the weather and the like and, which, in one embodiment, separates the cab compartment from that of the load bed so as to more appropriately preserve heat and air conditioning for the passengers rather than to the equipment loaded in the back of the vehicle.

It is additionally an object of the present invention to provide facilitated mounting features for the user of such a vehicle while being easy to store and taking up little space in the vehicle when not in use.

It is similarly an object of the invention to provide partial covering features in which any desired portion of the rear cab compartment or the load bed can be maintained while enabling enclosure of one completely independent of the enclosure of the other. These capabilities increase the flexibility of the use of such a vehicle by enabling the vehicle to carry unenclosed goods or revert back to carrying totally enclosed goods at a moment's notice.

Another objective of the present invention is to provide an enclosure device which allows a reduction in the weight of a recreational vehicle, thus enabling the carrying of heavier payloads, while reducing wind resistance and airdrag on highways, while keeping carried equipment and valuables out of sight, as well as a covering apparatus which can be mounted quickly and easily, capable of utilizing the present rigid roof-mounting apparatus already provided with the vehicle.

These and other objectives of the invention will become apparent from the following disclosure.

SUMMARY OF THE INVENTION

The present invention is a tonneau cover for recreational vehicles. The cover has a portion which covers the load bed as well as a portion which covers the rear side of the passenger cab compartment. It should be noted that when the conventional roof assembly is not being utilized on such a vehicle, the rear of the cab and the top of the load bed are left open.

The invention itself is preferably fabricated of a pliable, weather resistant material, such as plasticized fabric or canvas which protects the rear of the cab and the load bed from moisture and weather when the invention is affixed into its appropriate position. A plasticized material of substantially high molecular weight for example, could be used to obtain the features of weather and moisture resistance and to afford snug fit to the tonneau cover when it is utilized on the vehicle, as well as facilitated storage when the cover is not being used. The invention also comprises attachment means for affixing the tonneau cover simultaneously to the periphery of the load bed and the rear compartment of the passenger cab.

A preferred embodiment of the invention incorporates visibility means into the portion of the tonneau cover covering the rear side of the cab compartment thereby enabling rear view vision by the user of the vehicle. Additionally, insulating means are provided on the outer edges of the tonneau cover at all positions where contact is made between the tonneau cover and the vehicle itself so as to appropriately seal the covered cab compartment and load bed more effectively from external weather conditions, moisture, etc.

In the preferred embodiment of the invention, the load bed covering means and cab closure means meet at a substantially 90° angle. In this configuration, the load bed covering means covers in a substantially horizontal position the open side of the load bed and extends from the rear tailgate of the load bed towards the intersection of the load bed and cab compartment. The cab closure means at this intersection, which is preferably formed into one integral cover with the load bed covering means, angles up from the load bed so as to cover and securely close the open portion of the cab compartment in a substantially verticle position. The cab closure means attaches to the periphery of the cab compartment along the edges of the cab frame in a similar manner that the load bed covering means attaches the load bed frame around its periphery.

Another embodiment of the invention integrates the load bed covering means and cab closure means into a unidirectional cover unit extending in a substantially straight plane from the rear of the load bed to the top of the vehicle cab. Sides are formed into this embodiment of the tonneau cover and extend from the edges of the unidirectional plane of material, downwardly towards and attaching to the periphery of the load bed frame and the rear cab compartment respectively. As can be seen, these downwardly sloping sides in this particular embodiment approximate the shape of triangles. In a fashion similar to the previous embodiment, these sides and the forward and rear ends of the tonneau cover are attached to the load bed periphery and rear cab compartment periphery by vehicle attachment means.

On conventional vehicles of the type for which the tonneau cover invention is designed, there are provided a series of threaded orifices located along the periphery of the load bed frame and rear compartment cab frame. While attachment means can be independently fabricated into the load bed frame and onto the rear of the cab compartment frame, the preferred embodiment of the invention incorporates the use of the already existing threaded attachment orifices which, with minor modification, can be easily utilized to restrain the present invention in place securely and in the same manner that the same attachment orifices are used for securing the recreational vehicle's hardtop roof. For example, these attachment orifices can be utilized with attachment means which comprise a plurality of threaded bolts with securing heads insertable through eyelets fabricated into the periphery of the tonneau cover. When the eyelets on the periphery of the tonneau cover are aligned with the tapped thread attachment orifices in the frame of the load bed and the frame of the cab compartment, the threaded bolts can fasten the eyelets and thus the invention directly into the load bed frame and the cab compartment respectively. Further, another embodiment of attachment means utilizing buckle components, can be either fabricated on the frame independently or into the already existing attachment orifices with complementary buckle components placed on the periphery of the tonneau cover. These buckle components are aligned when the tonneau cover is correctly positioned in place over the load bed and the rear cab compartment. Male and female buckle components could thus be made to complement one another and upon fastening, fixedly secure the tonneau cover into place on the vehicle.

Still yet another version of attachment means which can be utilized with the present invention comprises a plurality of pivotable restraining pins which are insertable through eyelets fabricated into the surrounding periphery of the tonneau cover. Again, it should be noted that these pivotable restraining pins can either be fabricated independently into the frames of the load bed and rear cab compartment or can be mounted into the already existing attachment orifices by threaded bolt devices. Once the eyelets are brought down so as to allow the pivotable restraining pins to protrude through them, the restraining pins can then be pivoted downward resulting in a secure restraint of the eyelets and the tonneau cover, directly to the load bed frame and rear cab compartment frame respectively.

It should be noted that no matter which attachment means are utilized, the present invention can be utilized either as totally attached to the vehicle body or can be attached at only desired locations. For instance, if the user of a recreational vehicle has an item being carried in the load bed portion of the vehicle which should be covered and protected from the elements, and other items which do not need to be covered or which extend out of the load bed and beyond the vehicle, making covering difficult, the user can attach the present invention at only a few of the attachment locations and drape the rest of the invention over the article to be covered, leaving the remainder of the load bed open for loading of the items which are not to be covered. Similarly, while the rear cab compartment in most cases will be completely covered, on warmer days for purposes of ventilation, or, to make possible the insertion of lengthy pipes or tubing into the cab compartment from the load bed compartment, the rear cab covering means of the tonneau cover invention can be partially affixed to the periphery of the rear cab compartment frame.

In the preferred embodiment of the invention the insulating means previously discussed would comprise a rubber-like strip of padding around the periphery of the tonneau cover thereby sealing the locus of points at which the tonneau cover abuts the vehicle, the protecting the covered portions of the vehicle from the elements of the weather, moisture, cold, etc., while keeping the interior of the vehicle at a desired temperature.

The visibility means utilized in the preferred embodiment of the invention comprises a window apparatus aligned with the level of vision of the user of the recreational vehicle. The window enables viewing by the vehicle's user through the cab covering portion of the invention to the rear of the vehicle and from the load bed forward. Thus, the user of the vehicle would be able to see traffic conditions, etc. at the rear, and people in the load bed or behind the vehicle and still yet other vehicles would be able to see through the cab compartment towards the front for such things as traffic movement, etc.

BRIEF DESCRIPTION OF THE DRAWINGS

FIG. 4 is a side perspective of a second embodiment of the invention in place over the rear of the cab compartment and load bed;

FIG. 5 is a side elevational cut-away view of a bolt-type attachment device;

FIG. 6 is a side elevational cut-away view of a buckle-type attachment device;

FIG. 7 is a side elevational cut-away view of the pivotal pin attachment device; and FIG. 8 is a side elevational cut-away view of a button-type attachment device.

Detailed Description

Figure 1:
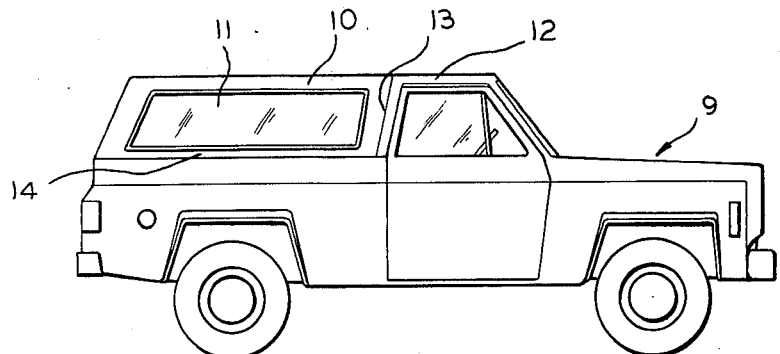
FIG. 1 is a side elevational view of the recreational vehicle utilizing a conventional rigid enclosure apparatus for covering the rear of the cab compartment and top of the load bed.

While this invention is susceptible of embodiment in many different forms, there is shown in the drawings and will herein be described in detail, two specific embodiments, with the understanding that the present disclosure is to be considered as exemplification of the principles of the invention and is not intended to limit the invention to the embodiment illustrated.

Recreational vehicle 9 is shown in FIG. 1 of the drawings having integrated roof assembly 12 which ends at the rear side of the cab compartment 13. Rigid enclosure apparatus 10 is also shown having glass sidepanel 11, and which is attached at the rear of the cab 13 atop and covering load bed edge 14.

Figure 2:
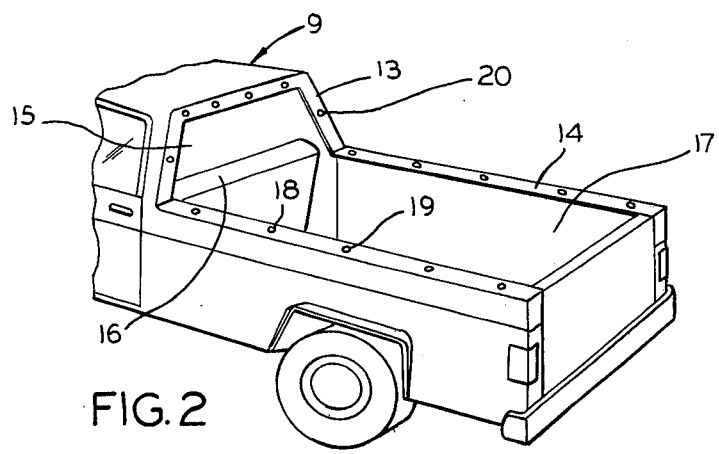
FIG. 2 is a side perspective view of a portion of the recreational vehicle showing the exposed rear cab compartment and load after removal of the rigid roofing enclosure and further displaying attachment orifices provided with the vehicle.

When the rigid roof 10 of FIG. 1 is removed, recreational vehicle 9, as shown in FIG. 2 remains, having rear cab compartment frame 13 as well as load bed frame 14 exposed. Load bed 17 as well as the rear cab compartment 15 remain open as shown wherein passenger seat 16 is exposed. Attachment means, such as those shown by attachment orifices 18, 19 and 20 are similarly shown.

Figure 3:
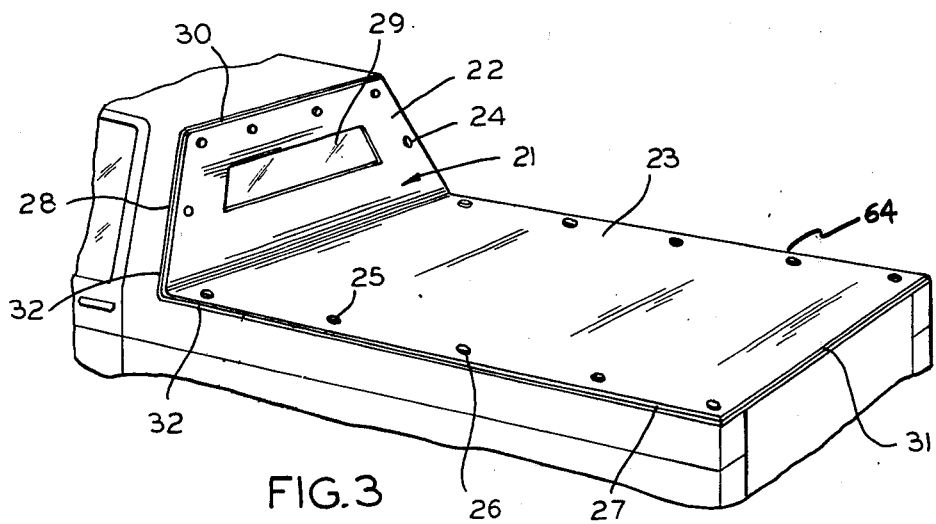
FIG. 3 is a side perspective view of one embodiment of the invention displaying particularly the enclosure of the load bed and rear cab compartment.

One embodiment of the present invention, tonneau cover 21, is shown in FIG. 3 having cab closure means 22, as well as load bed covering means 23. Tonneau cover 21 extends from the rear 31 of the covered load bed forward to the intersection with the cab and then up the rear side of rear cab compartment 28, ending in abutment with the rear edge of the integrated roof 30. Insulating means 32, as well as window apparatus 29 and attachment means such as 24, 25 and 26 are shown. The tonneau cover 21 spans the width of the load bed and the rear cab compartment from load bed side 27 to load bed side 64.

A second embodiment of the tonneau cover 33 is shown in FIG. 4. In this particular embodiment the tonneau cover extends in a substantially flat plane from load bed tailgate 38 up to integrated roof edge 35. Triangularly shaped side 37 slopes down from the flat plane of the material comprising the tonneau cover so as to effectively meet the frame of the load bed as shown by reference numeral 36. Attachment means such as attachment means 39 and 40 are also shown as is a portion of load bed 41 and a portion of passenger compartment 42 through window apparatus 34.

Various attachment means which can be utilized to maintain the tonneau cover invention in place in either a manner of total enclosure or partial enclosure over the load bed and cab compartment are shown in FIGS. 5 through 8. Bolt-type device 47 shown in FIG. 5 shows bolt 48 extending into attachment orifice 49 restraining cover material 52 and insulation material 45 in place within eyelet 43. Bolt head 47 restrains the cover proximate to vehicle body portion 46.

Buckling attachment means 50-51 as shown in FIG. 6 utilizes female buckle component 50 embedded in vehicle frame 55 and male component 51 embedded in cover material 53 and insulation material 54 to attach the invention to the recreational vehicle.

The pivotal pin restraining device 56 is shown in FIG. 7 in which threaded body 59 of the attachment means is inserted into the provided attachment orifice. After insertion through eyelet 60, pivotable pin 57 is rotated as shown to restrain the eyelet and thus the tonneau cover invention in place. In a similar manner the button-type device of FIG. 8 in which toggle 61 is inserted through slotted eyelet 63 and rotated horizontally to restrain the eyelet in place, maintaining the cover proximate to the vehicle body.

The foregoing description and drawings merely explain and illustrate the invention and the invention is not limited thereto, except insofar as the appendant claims are so limited, as those skilled in the art to hve the disclosure before them will be able to make modifications and variations therein without departing from the scope of the invention.

What is claimed is:

1. A tonneau cover for recreational vehicles comprising:
    load bed cover means of substantially pliable weather-resistant material for enclosing an open load bed having a peripheral frame;
    cab closure means of substantially pliable weather-resistant material which emanates from a first end of said load bed cover means, for closing off the rear opening of a vehicle cab compartment;
    vehicle attachment means for affixing said load bed cover means over the top of said load bed of said vehicle and for affixing said cab closure means over said rear opening of said vehicle cab compartment respectively;

said load bed cover means and said cab closure means meeting at the intersection of said load bed and cab so as to form a substantial angle thereat;

said load bed cover means juxtaposed to and covering the open portion of said load bed in a substantially horizontal position and attached to the frame of said load bed by said vehicle attachment means;

said cab closure means juxtaposed to and covering the open portion of the rear of said cab compartment in a substantially vertical position and attached to the frame of said rear cab compartment by said vehicle attachment means;

said vehicle attachment means capable of affixing said tonneau cover in degrees ranging from total enclosure of said load bed and cab compartment to only partial attachment over said load bed and cab compartment enclosing only a desired portion of said bed and cab compartment respectively.

2. The tonneau cover according to claim 1 in which the invention further comprises:

visibility means in said cab closure means thereby enabling rear vision viewing by a user of said vehicle; and insulating means surrounding the outer edges of said cab closure means and said load bed cover means to effectively seal said cab and load bed from external weather conditions.

3. The invention according to claim 2 in which said insulating means comprises a rubber-like material stripping around the periphery of said tonneau cover thereby sealing the locus of points at which the tonneau cover abuts the vehicle from elements of weather and moisture.

4. The invention according to claim 2 in which said visibility means comprises a window apparatus in said tonneau cover aligned with the level of vision of a user of said vehicle and enabling viewing through said cab to the rear of the vehicle and from said load bed forward, into the cab of said vehicle and beyond.

5. The invention of claim 1 in which said substantially pliable weather-resistant material comprises a plasticized material of substantially high molecular weight thereby affording to said tonneau cover snug fit in placement on said vehicle, and facilitated storage when not in placement on said vehicle.

6. The invention according to claim 1 in which said substantially pliable weather-resistant material is a closely woven substantially heavy canvas fabric.

7. The invention according to claim 1 in which said vehicle attachment means comprises a plurality of threaded bolts, each of which may be inserted through each of a series of eyelets respectively surrounding the periphery of said tonneau cover, each of said series of eyelets aligning with each of a series of tapped threaded holes respectively in said frames of said load bed and said rear cab;

each of said threaded bolts fastening each of said eyelets, and in turn, said tonneau cover directly to said load bed frame and said rear cab compartment frame respectively.

8. The invention according to claim 1 in which said vehicle attachment means comprises a plurality of male and female buckle components:

one or more of said male and female components affixed to the frames of said load bed and said rear cab compartment;

one or more of said male and female components affixed to the periphery of said tonneau cover;

said buckle components positioned so that a male buckle component is aligned with a female buckle component respectively enabling said cover to be snapped and buckled securely onto said vehicle.

9. The invention according to claim 1 in which said vehicle attachment means comprises a plurality of pivotable restraining pins insertable through a series of eyelets surrounding the periphery of said tonneau cover;

each of said eyelets respectively aligning with each of said restraining pins positioned in said frames of said load bed and said rear cab;

each of said restraining pins passing through each of said aligned eyelets respectively and fastening said eyelets and said tonneau cover directly to said load bed frame and said rear cab compartment respectively when said pins are pivoted.

10. The invention according to claim 1 in which said vehicle attachment means further includes incorporation of threaded apertures already provided by said vehicle thereby enabling attachment of said tonneau cover without affixing attachment means in a preliminary manner to said vehicle.

* * * * *

UNITED STATES PATENT AND TRADEMARK OFFICE
CERTIFICATE OF CORRECTION

PATENT NO. : 4,061,394
DATED : December 6, 1977
INVENTOR(S) : George M. Vodin

It is certified that error appears in the above-identified patent and that said Letters Patent are hereby corrected as shown below:

| | |
|---|---|
| Col. 5, line 3: | After the word "vehicle,", "the protecting" should read -- and protecting --. |
| Col. 5, line 27 | After the word "load" insert --bed--. |
| Col. 6, line 50 | "hve" should read --have--. |

Signed and Sealed this

Fourteenth Day of March 1978

[SEAL]

Attest:

RUTH C. MASON
Attesting Officer

LUTRELLE F. PARKER
Acting Commissioner of Patents and Trademarks